United States Patent [19]
Graham

[11] Patent Number: 6,109,475
[45] Date of Patent: Aug. 29, 2000

[54] PARTS FEEDER SYSTEM ADAPTABLE TO BOTH MANUAL FEED AND AUXILIARY HOPPER FEED

[76] Inventor: S. Neal Graham, 12997 Fawns Ridge, Fishers, Ind. 46038

[21] Appl. No.: 09/059,972

[22] Filed: Apr. 14, 1998

[51] Int. Cl.[7] ..................................................... B25H 9/00
[52] U.S. Cl. ........................... 221/156; 221/174; 221/160; 198/609; 198/757; 198/860.4
[58] Field of Search ..................................... 221/156, 174, 221/160, 200; 198/609, 757, 860.4; 222/196, 197, 200

[56] References Cited

U.S. PATENT DOCUMENTS

| | | | |
|---|---|---|---|
| 2,921,713 | 1/1960 | Zanotto et al. | 198/757 |
| 2,985,280 | 5/1961 | Burgess, Jr. | 198/220 |
| 3,194,392 | 7/1965 | Manderbach | 198/757 |
| 3,474,890 | 10/1969 | Center | 198/33 |
| 3,521,735 | 7/1970 | Gallatin | 198/33 |
| 3,658,172 | 4/1972 | Hacker | 198/220 |
| 3,746,211 | 7/1973 | Burgess, Jr. | 221/156 |
| 3,747,738 | 7/1973 | Greck | 198/33 |
| 4,148,389 | 4/1979 | Dixon | 198/389 |
| 4,156,494 | 5/1979 | Nelson | 221/156 |
| 4,220,257 | 9/1980 | Hazelwood et al. | 221/156 |
| 4,236,302 | 12/1980 | Kuehling | 29/753 |
| 4,384,535 | 5/1983 | McKelvie | 198/757 |
| 4,436,197 | 3/1984 | MacDonald | 198/389 |
| 4,450,948 | 5/1984 | Naito et al. | 198/389 |
| 4,453,626 | 6/1984 | Roberts et al. | 198/391 |
| 4,462,508 | 7/1984 | Graffius | 221/160 |
| 5,526,917 | 6/1996 | Homma | 198/757 |
| 5,757,092 | 5/1998 | Graham | 198/33 |

OTHER PUBLICATIONS

Visumatic Screwfeeder Model 94 (Specification and Photograph).

*Primary Examiner*—Christopher P. Ellis
*Assistant Examiner*—Khoi H. Tran
*Attorney, Agent, or Firm*—Woodard, Emhardt, Naughton, Moriarty & McNett

[57] ABSTRACT

The present invention includes a parts feeder system capable of being used in either a first mode without an auxiliary hopper or in a second mode with and auxiliary hopper. The parts feeder system includes an enclosure having an opening therein. In the first or manual-feed mode, the parts feeder system is replenished my manual filling thereof, and in the second or auxiliary hopper-feed mode the opening in the enclosure accommodates an auxiliary hopper. When the auxiliary hopper is used, the dispensing chute of the auxiliary hopper is positioned over the supply of the parts feeder. Additionally, the enclosure of the parts feeder system is configured with grooves so that it can be secured by a minimal number of fixation elements and can therefore be easily attached and removed.

21 Claims, 8 Drawing Sheets

PARTS FEEDER SYSTEM ADAPTABLE TO BOTH MANUAL FEED AND AUXILIARY HOPPER FEED

FIELD OF THE INVENTION

The present invention pertains generally to parts feeding and sorting devices, especially a parts feeder system which may be supplied with parts either directly or via a detachable or portable matable auxiliary hopper.

BACKGROUND OF THE INVENTION

Automated devices and systems for providing individual parts at an output from a nonordered supply are well known. Generally, such systems draw individual parts from a reservoir of disoriented parts, orient them as desired, and transport them singly to another machine or tool, which then uses or otherwise operates on the individual part. Such systems commonly include a parts feeder system, a parts transporting system, and may include a tool or other further processing machinery.

The parts feeder system is generally designed to orient the individual parts in a desired fashion and to move them one at a time away from the parts reservoir. For example, a feeder system may operate to remove individual screws from a reservoir, orient them so that the head of each screw is in the rear relative to the screws' direction of motion, and move the individual screws to the input of a transporting system. Such feeder systems may include vibratory parts feeder machinery, such as that disclosed in U.S. Pat. No. 5,630,497 and/or in co-pending commonly-owned application Ser. No. 08/806,109.

Currently-available parts feeder systems are relatively small machines able to sit on a workbench, cart, or similarly sized surface. A bowl or similar container within the parts feeder system forms the reservoir of parts to be used. To keep the system operating, the supply of parts in the bowl must be renewed. Some known parts feeder systems can only be supplied by manual loading, wherein a person accesses the bowl of the feeder system by opening or removing a cover or access panel and replenishes the supply directly. This type of system has a limitation in that the supply of parts available to the feeder system is determined by the capacity of its bowl, which, given the relatively small size of parts feeder systems, is commonly small. Thus, only a relatively small number of parts may be manually loaded or fed into such a direct-feed parts feeder system at one time. Direct manual loading is labor-intensive and must be performed relatively often, with resultant machine down-time.

Feeder systems have also been developed which have an integral or permanently attached auxiliary hopper for supplying parts to the bowl of the parts feeder system. The auxiliary hopper generally has a larger capacity than the bowl and is fixed in the system so that it continuously feeds parts into the bowl. However, available parts feeder systems having such an auxiliary hopper usually fix the auxiliary hopper over the bowl of the feeder system. Access to the system, particularly the bowl and associated machinery, is consequently impeded or blocked by the auxiliary hopper.

A further limitation to currently-available parts feeder systems is that they are single mode systems that operate either as a direct manually-fed or as an auxiliary hopper-fed system, but cannot be switched from one mode to operate in the other mode. That is, such parts feeder systems do not have the capability of switching between direct manual feed and auxiliary hopper feed due to the integral nature of the auxiliary hopper in the feeder system. Manual-feed systems are not configured to allow use of an auxiliary hopper and cannot be retrofitted. Thus, a purchaser of a manual-feed parts feeder system cannot upgrade it to include an auxiliary hopper, and therefore must purchase a new parts feeder if an auxiliary hopper feed is desired. Conversely, the purchaser of a parts feeder system having an auxiliary hopper will have difficulty accessing the bowl of the feeder system, and cannot replace or interchange the auxiliary hopper component by itself. Instead, the purchaser must purchase an entirely new parts feeder system if an alternate auxiliary hopper, or no hopper at all, is desired.

SUMMARY OF THE INVENTION

One form of the present invention contemplates an apparatus comprising an auxiliary hopper adapted for receiving parts and a parts feeder system having a bowl for receiving parts, with the parts feeder system having a first mode wherein the auxiliary hopper is removably coupled with the parts feeder system and delivers parts to the bowl, and a second mode wherein the auxiliary hopper is uncoupled from the parts feeder system and does not deliver parts to the bowl.

Another form of the present invention contemplates a system comprising vibratory parts feeder machinery having a bowl adapted for receiving parts, an enclosure substantially surrounding the machinery and having an opening for allowing access to the bowl, and an auxiliary hopper comprising a container portion, a chute portion, a drive portion, and a base portion. In a first mode, the vibratory parts feeder machinery is interconnected to the auxiliary hopper by inserting the chute portion of the auxiliary hopper into the opening of the enclosure to deliver parts to the bowl, and in a second mode, the vibratory parts feeder is separated from the auxiliary hopper.

Another form of the present invention contemplates a method of replacing a first auxiliary hopper having a chute portion with a second auxiliary hopper having a chute portion in an apparatus comprising the first auxiliary hopper coupled to a parts feeder system. The method comprises uncoupling the first auxiliary hopper and the parts feeder system by withdrawing the chute portion of the first auxiliary hopper from an opening in the enclosure of the parts feeder system, and coupling the second auxiliary hopper and the parts feeder system by inserting the chute portion of the second auxiliary hopper into the opening.

Another form of the present invention contemplates a method of converting a parts feeder system having an enclosure with an opening therein from a first mode, in which said parts feeder system receives parts from an auxiliary hopper having a chute portion, with the auxiliary hopper being coupled to the parts feeder system by inserting the chute portion into the opening, to a second mode in which the parts feeder system does not receive parts from an auxiliary hopper. The method comprises separating the auxiliary hopper and the parts feeder system by withdrawing the chute portion from the opening.

Another form of the present invention contemplates a method of converting a parts feeder system having an enclosure with an opening from a first mode, in which the parts feeder system does not receive parts from an auxiliary hopper to a second mode in which the parts feeder system receives parts from an auxiliary hopper having a chute portion. The method comprises coupling the auxiliary hopper and the parts feeder system by inserting the chute portion of the auxiliary hopper into the opening.

Another form of the present invention contemplates a combination comprising a parts feeder system for individually dispensing parts having a bowl for receiving the parts and a base plate with at least one groove defined therein, a structure coupled to the base plate with at least one groove defined therein, and a side member having a first portion retained in the groove in the plate and a second portion retained in the groove in the structure. The structure or the side member has one or more openings allowing access to the bowl of the parts feeder system.

These and other aspects of the invention will be evident to those of skill in this art.

DESCRIPTION OF THE PREFERRED EMBODIMENT

Figure 1:
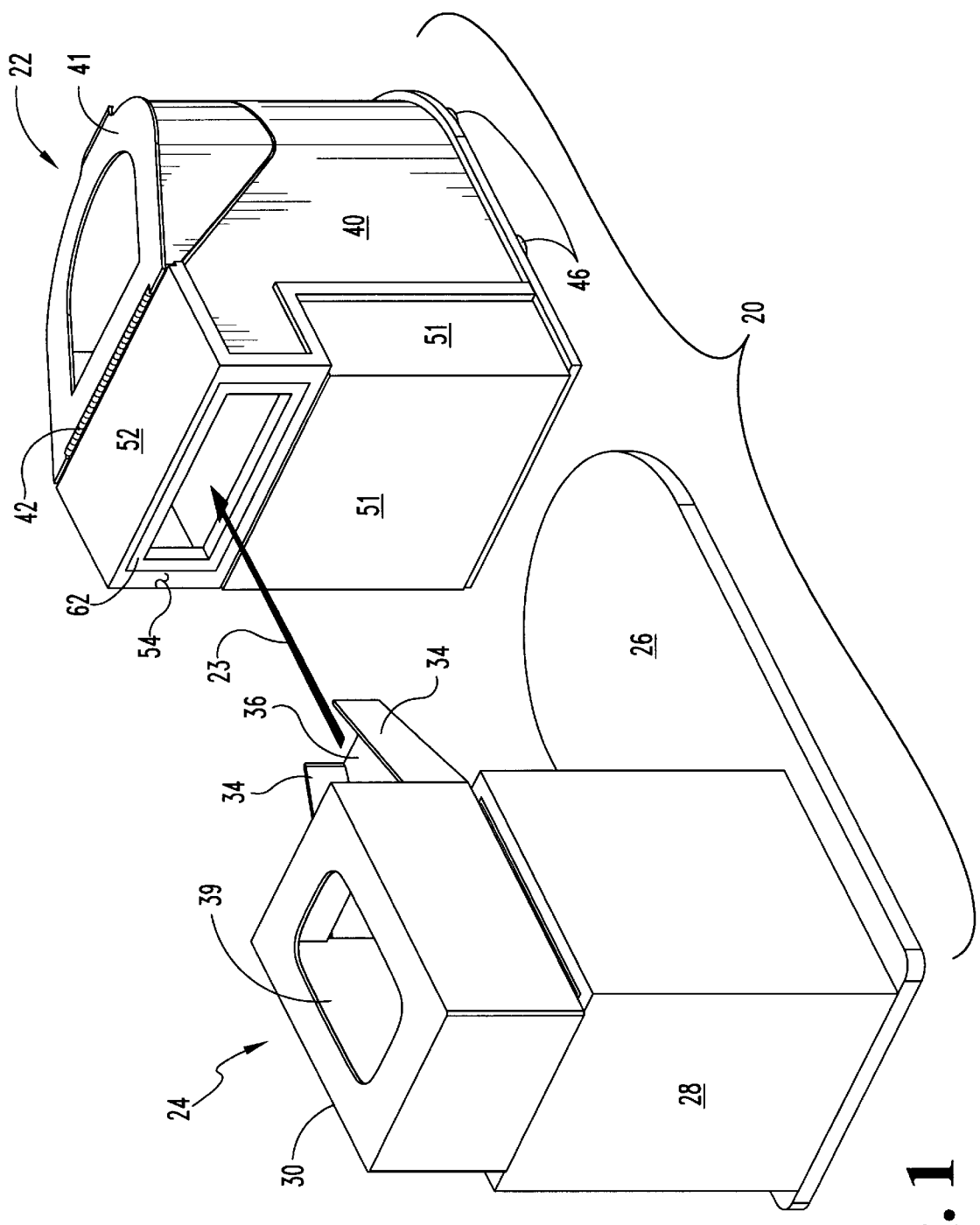
FIG. 1 is a partially-exploded perspective view of a parts feeder system and auxiliary hopper according to one embodiment of the present invention.

For the purposes of promoting an understanding of the principles of the present invention, reference will now be made to the preferred embodiments illustrated in the drawings and specific language will be used to describe the same. It will nevertheless be understood that no limitation of the scope of the present invention is thereby intended, such alterations and further modifications in the illustrated embodiments, and such further applications of the principles of the present invention as illustrated therein being contemplated as would normally occur to one skilled in the art to which the present invention relates.

Figure 2:
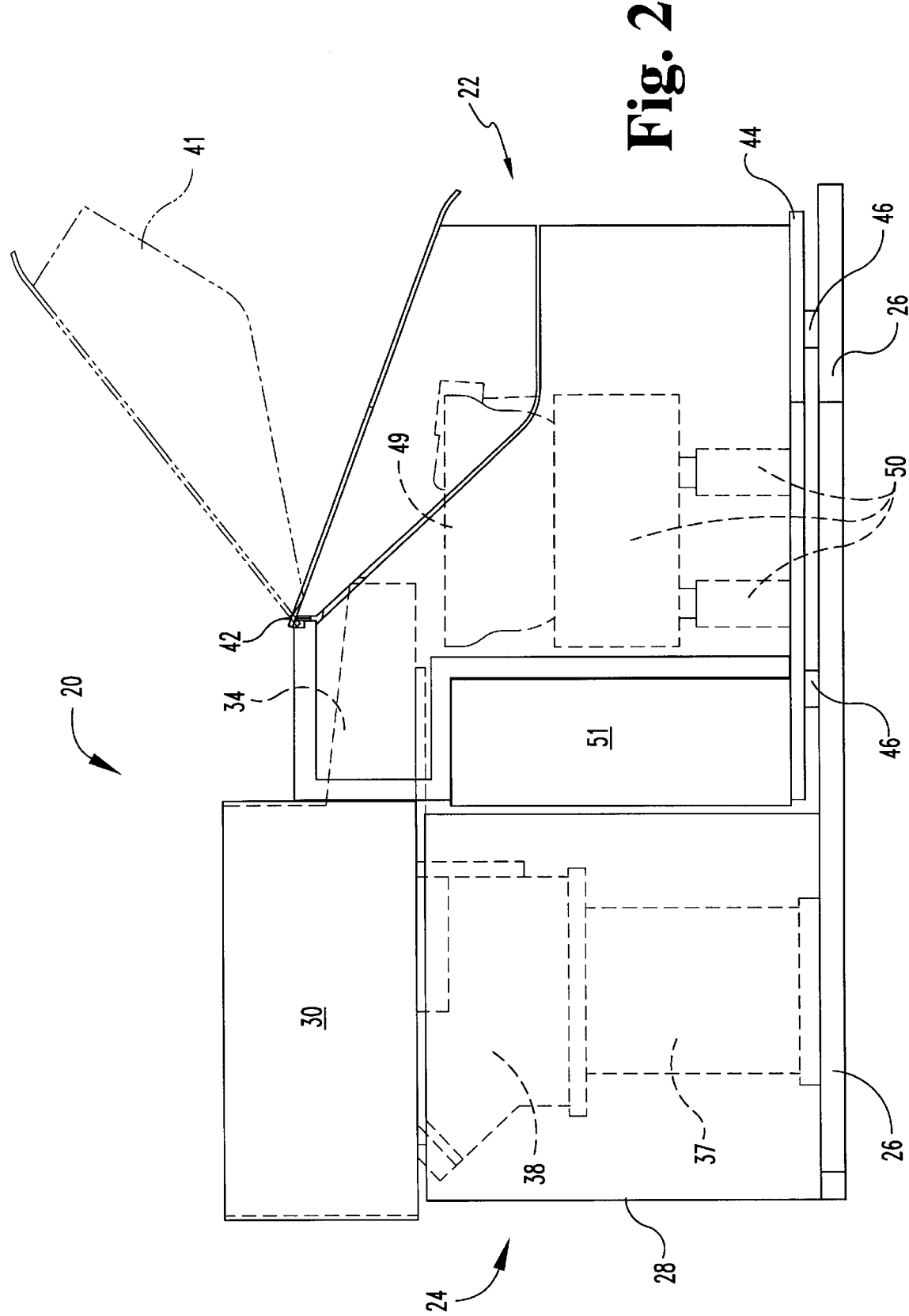
FIG. 2 is a side elevational view of the parts feeder system and auxiliary hopper of FIG. 1 coupled together.

With reference generally to FIGS. 1 and 2, there is illustrated an apparatus 20, which includes a parts feeder system 22 and an auxiliary hopper 24. Parts feeder system 22 and auxiliary hopper 24 are designed and constructed to be readily separable and interconnectable so that parts feeder system 22 can be used with a variety of auxiliary hoppers, or in a stand-alone mode with no auxiliary hopper. When used together, parts feeder system 22 and auxiliary hopper 24 are interconnected by moving them together, as indicated by arrow 23, to form apparatus 20.

Figure 3:
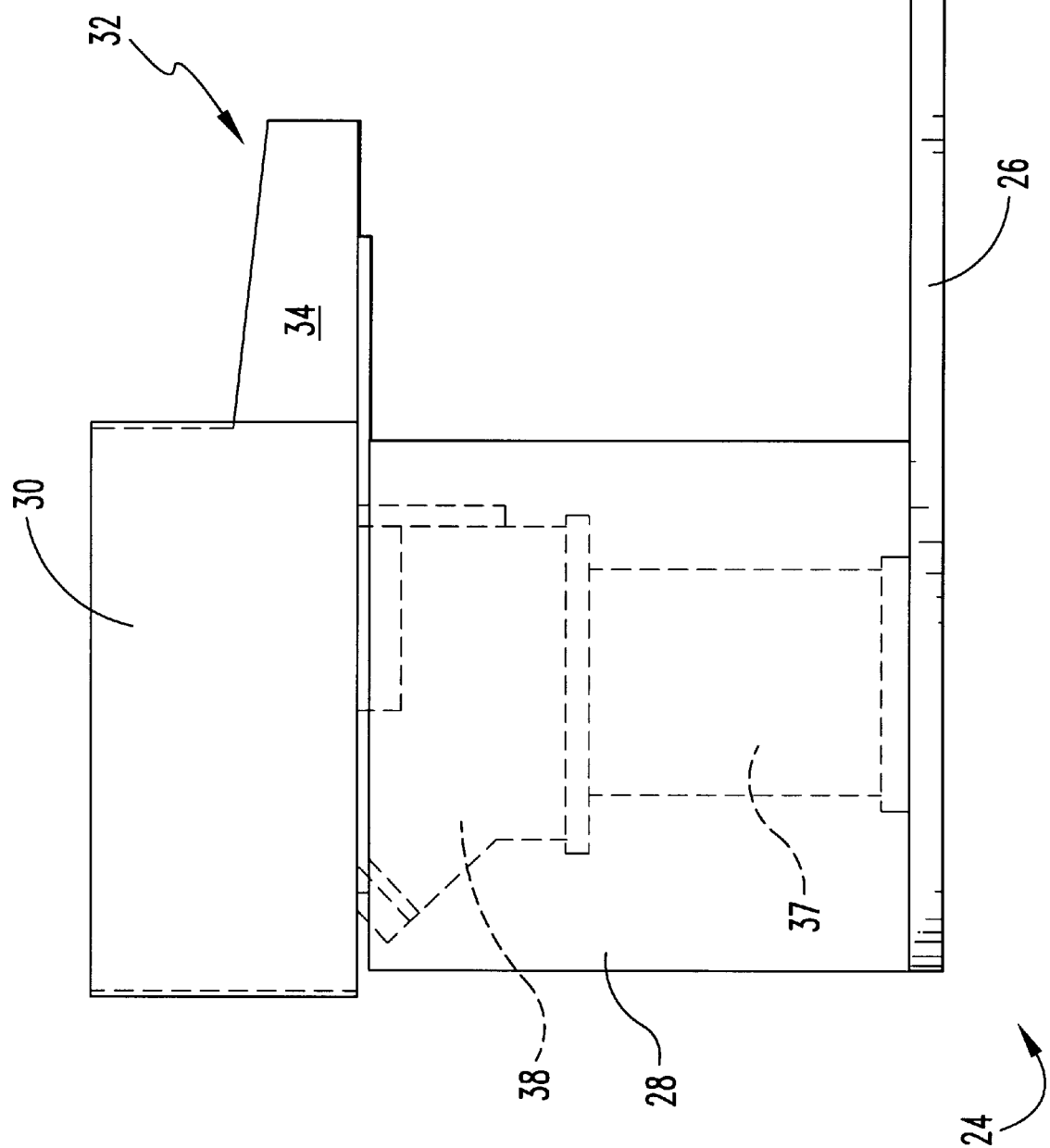
FIG. 3 is a side elevational view of the auxiliary hopper comprising a portion of the apparatus of FIG. 1.
Figure 4:
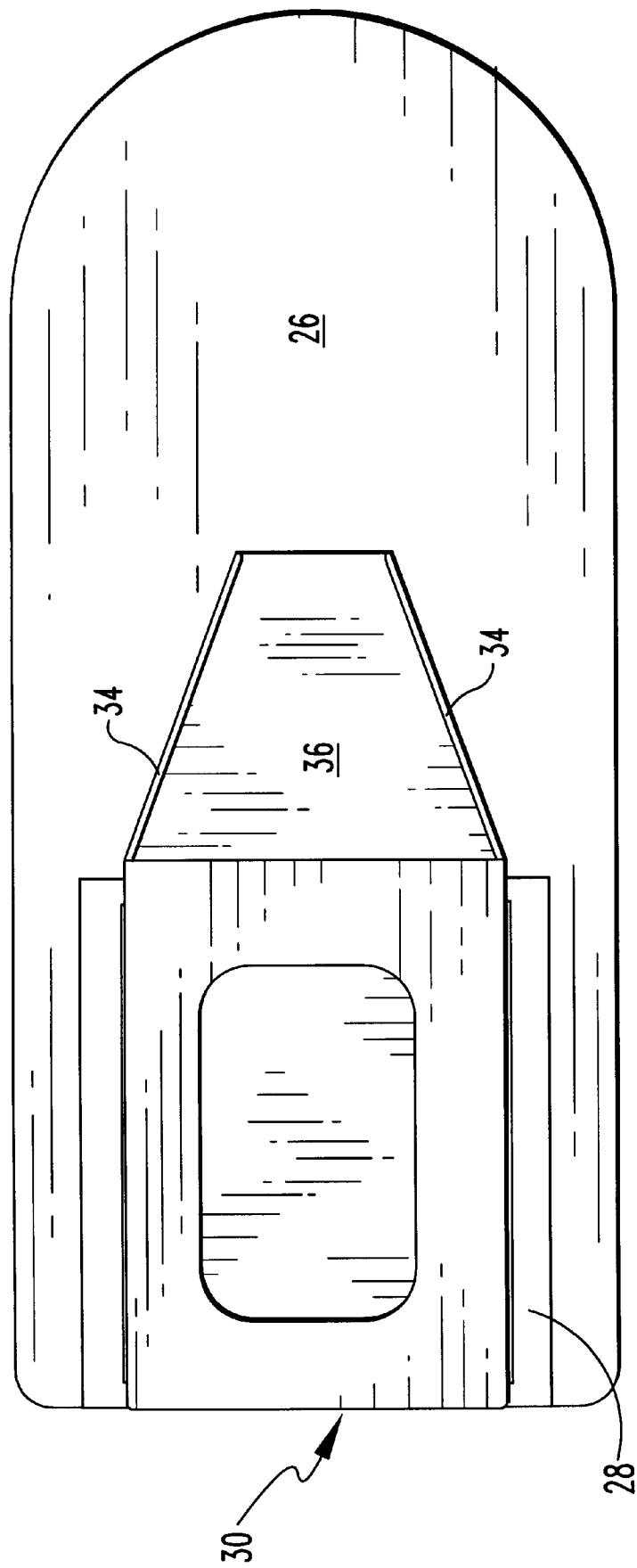
FIG. 4 is a top view of the auxiliary hopper comprising a portion of the apparatus of FIG. 2.

Referring also to FIGS. 3 and 4, there is illustrated auxiliary hopper 24 which includes a base plate 26, an enclosure 28, a container portion 30, and a chute portion 32. Chute portion 32 includes spaced side wall members 34 and floor surface 36. Container portion 30 holds components or parts for subsequent feeding by parts feeder system 22. Such components may be, but are not limited to, screws. Enclosure 28 encloses a driving mechanism 37 and a stand 38 (shown in phantom), which act on container portion 30 to move components from container portion 30 into and through chute portion 32. In a specific embodiment of the present invention, stand 38 and enclosure 28 are coupled to a base plate 26. Container portion 30 is filled with components through opening 39 in the top of container portion 30.

Figure 5:
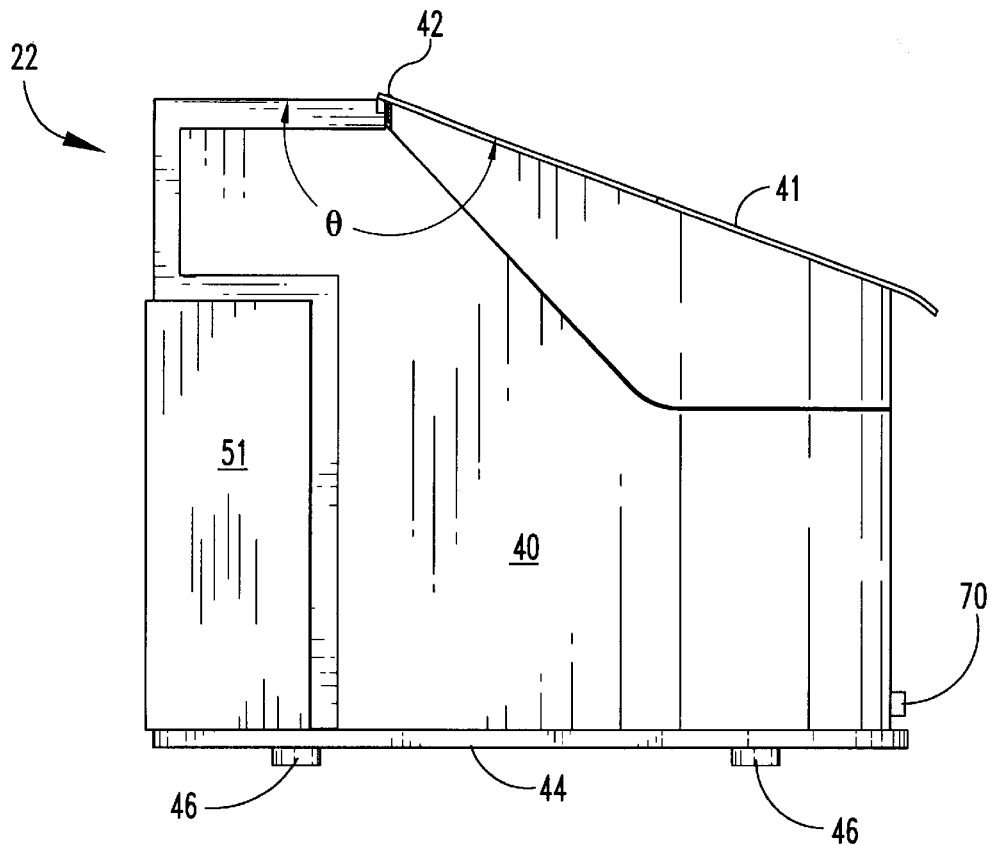
FIG. 5 is a side elevational view of the parts feeder system comprising a portion of the apparatus of FIG. 1.
Figure 6:
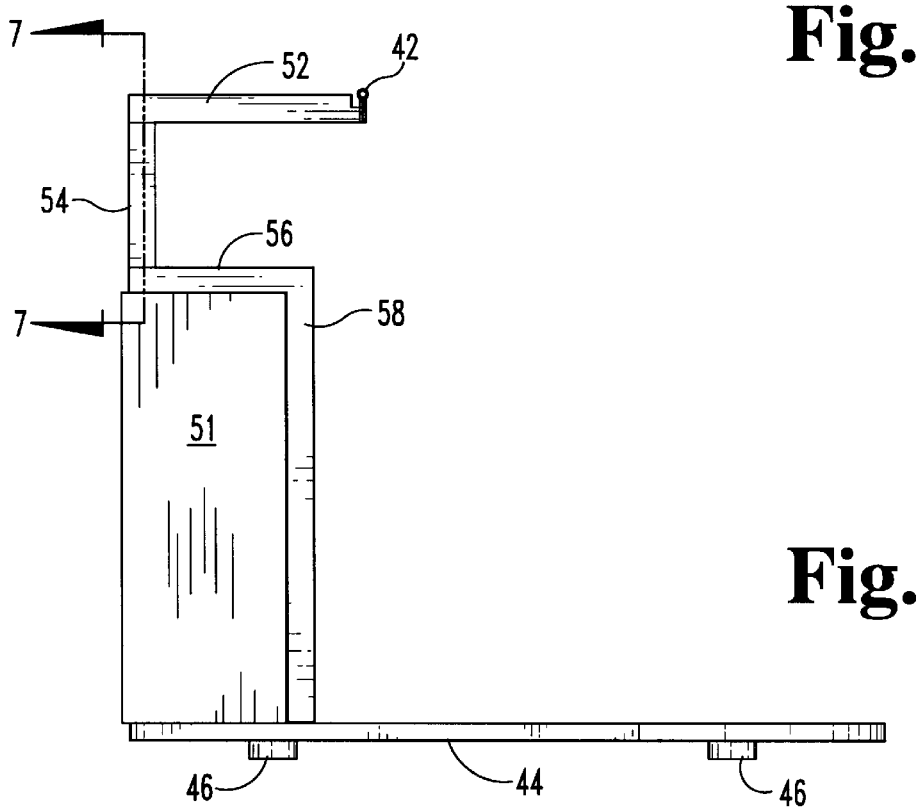
FIG. 6 is a side elevational view of the frame elements and control panel enclosure comprising a portion of the parts feeder system of the apparatus of FIG. 1.

Referring now to FIGS. 2, 5 and 6, there is shown parts feeder system 22 according to the present invention. In one embodiment, parts feeder system 22 includes side enclosure 40, cover 41, and base plate 44. Base plate 44 and base plate 26 may be made of numerous materials, although a preferred material is aluminum. Base plate 44 includes a groove 45, shown in FIG. 10. In a specific embodiment of the invention, groove 45 is in proximity to and follows a substantial portion of the perimeter of base plate 44, although other groove configurations, including multiple grooves or alternate placement of groove(s), are considered to be within the scope of the invention.

Also positioned on base plate 44 is machinery for feeding parts in a parts feeder system, shown in phantom in FIG. 2. In one embodiment of the invention, the machinery may be a vibratory parts feeder system including a bowl 49 and associated drive mechanisms 50. In a specific embodiment, bowl 49 and associated drive mechanisms 50 may be those described in U.S. Pat. No. 5,630,497 and/or co-pending patent application Ser. No. 08/806,019. As used herein, the term "bowl," unless specifically referred to otherwise, refers to any reservoir or container used to hold components to be fed by a parts feeder system. Controls for the parts feeder machinery are generally located within control panel and enclosure 51.

In one embodiment, base plate 44 includes a plurality of feet 46 on the underside of base plate 44. Feet 46 may be integral with or otherwise affixed to base plate 44, and in a specific embodiment are made of rubber or other similar material to minimize transmission of vibration and/or noise. Base plate 26, with auxiliary hopper coupled thereto in one embodiment, may have feet receiving portions (not illustrated) formed therein to accommodate feet 46 when parts feeder system 22 is coupled with auxiliary hopper 24.

On the upper side of base plate 44 there is attached a frame for holding an enclosure around the machinery of parts feeder system 22. In the embodiments illustrated in FIGS. 6–10, the frame comprises frame elements 52, 54, 56 and 58. Cover 41 is attached by a hinge 42 to frame element 52. Cover 41 and hinge 42 are positioned to allow cover 41 to rotate between a closed position, shown in FIG. 5, and an open position (shown in phantom in FIG. 2) wherein cover 41 is substantially over frame element 52 and the space inside side enclosure 40 is accessible through the opening left when cover 41 is rotated to the open position. The angle θ between the top of cover 41 in the closed position and frame element 52 may be any angle such that cover 41 may be opened when parts feeder system 22 is used with an auxiliary hopper 24 without having interference or substantial restriction to access to the space inside side enclosure 40. In one specific embodiment, the angle θ is about 159 degrees.

Figure 7:
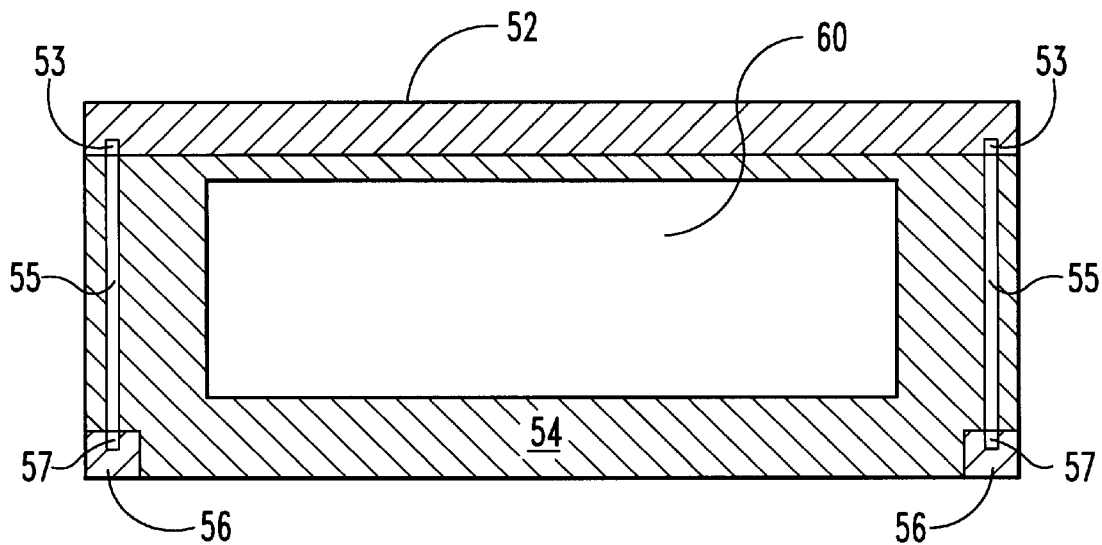
FIG. 7 is an enlarged sectional view of the frame elements of FIG. 6 taken along the line 7—7.
Figure 9:
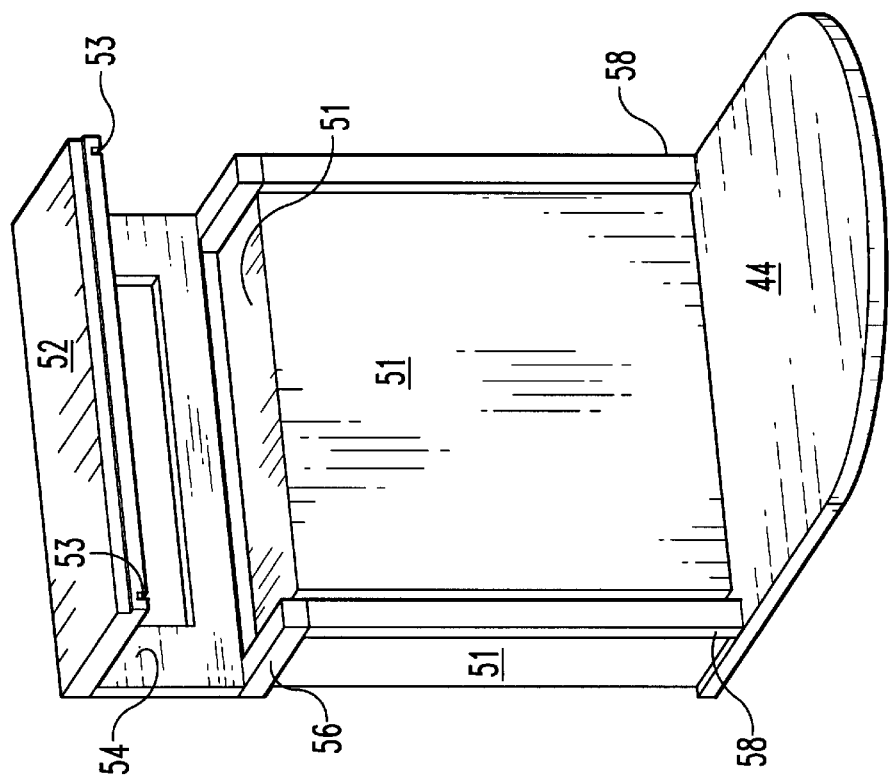
FIG. 9 is a perspective view of the frame elements and base comprising a portion of the parts feeder system of the apparatus of FIG. 1.

Referring to FIGS. 6, 7, and 9, frame elements 52, 54, 56, and 58 include one or more grooves configured to receive therein at least a portion of side enclosure 40. (For clarity, the grooves are not shown in FIG. 9.) In one specific embodiment, frame element 52 is a generally rectangular member, including two grooves 53 parallel to and proximate to the shorter ends of frame element 52, and frame element 54 is a generally rectangular member, including two grooves 55 parallel to and proximate to the shorter sides of frame element 54. Frame elements 56 may comprise two elongated members each including a groove 57 which runs substantially the entire length of the elongated member. Frame elements 58 may also comprise two elongated members, and also have longitudinal grooves 59 therein.

Figure 8:
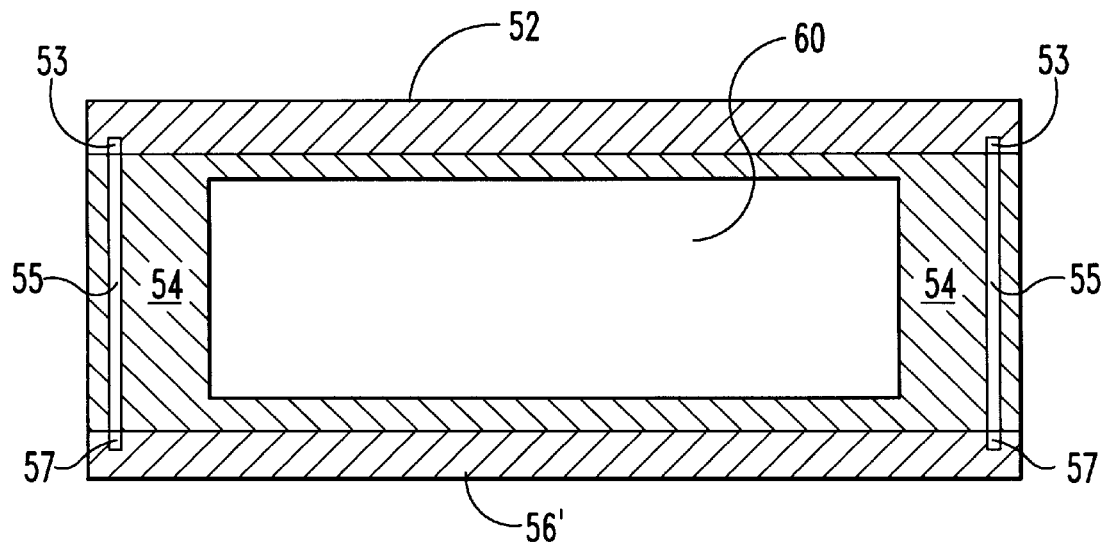
FIG. 8 is a view as in FIG. 7, comprising an alternate embodiment of the frame elements of the present invention.
Figure 10:
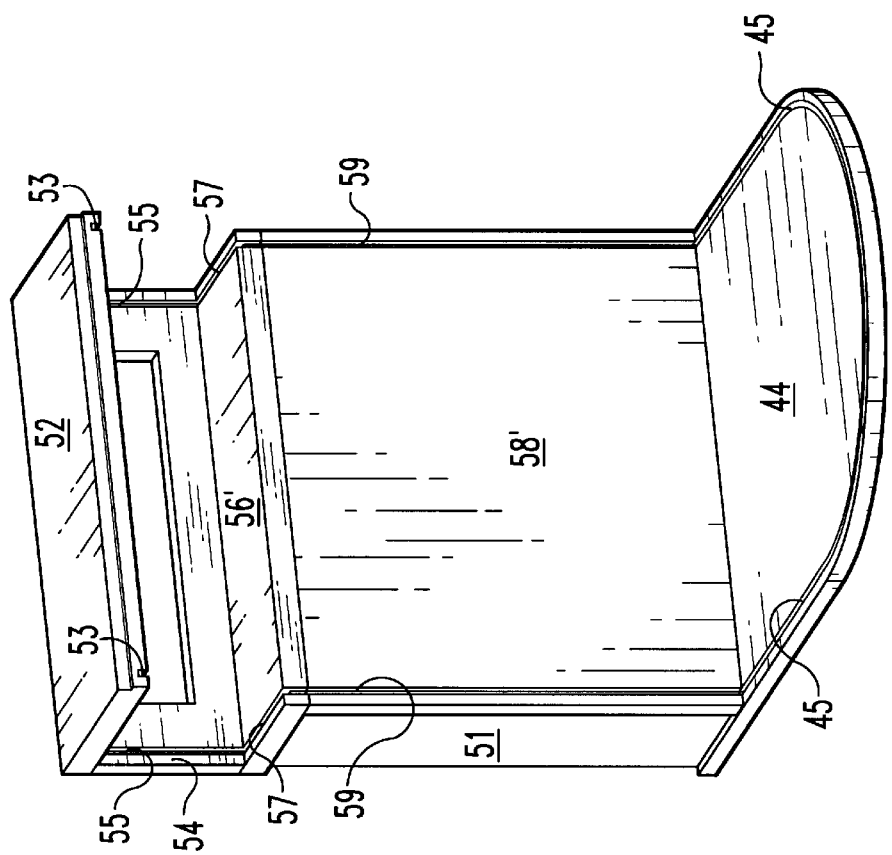
FIG. 10 is a view as in FIG. 9, comprising an alternate embodiment of the frame elements of the present invention.

Other embodiments of the frame elements are within the scope of the present invention. Referring to FIGS. 8 and 10, a second embodiment comprises frame element 56' in the form of a single substantially planar rectangular frame element, and frame element 58' in the form of a single substantially rectangular frame element, each having one or more grooves configured to receive a portion of side enclosure 40. In a specific embodiment, the groove(s) are near one or more edges of frame elements 56' and/or 58'. Further, frame elements 56 and 58 or 56' and 58' may be integrally constructed or joined to form one or more L-shaped members. Also, the geometric shapes and depths of the groove(s) in a given frame element may be of a multitude of shapes and sizes as needed to accommodate alternate enclosure characteristics.

In the embodiments of the invention depicted in FIGS. 6–10, frame element 52 is coupled to frame element 54, and frame element 54 is in turn attached to a rear portion of frame elements 56 or 56'. Upper portions of frame elements 58 or 58' are attached to forward portions of frame elements 56 or 56'. As FIG. 7 shows, in one embodiment grooves 53 and 55 meet where frame elements 52 and 54 meet, and grooves 55 and 57 meet where frame elements 54 and 56 meet. In another specific embodiment, frame elements 56 or 56' are generally parallel to frame element 52, and frame elements 58 or 58' are generally parallel to frame element 54.

The present invention also includes a side enclosure 40, best seen in FIGS. 1 and 5. Side enclosure 40 may be made of any desired material, but preferred materials are polyurethane, stainless steel and fiberglass. In one embodiment, side enclosure 40 is a single piece. Side enclosure 40 couples to frame elements 52, 54, 56, and 58 and to base plate 44 by fitting portions of side enclosure element 40 into grooves 53, 55, 57, 59 and 45. Side enclosure 40 may have any shape suited for coupling with the groove or grooves in the frame elements and base plate. As one example, in the embodiment shown in FIGS. 1 and 5, side enclosure 40 is an irregularly shaped element that wraps around the forward portion of parts feeder system 22. In another embodiment, side enclosure 40 may include several pieces which are coupled to each other, and/or in one or more of the grooves in one or more of frame elements 52, 54, 56 and 58.

In the embodiment in which side enclosure 40 is a single piece a single fixation device 70, secures side enclosure 40 to frame elements 52, 54, 56, and 58 and base plate 44. Embodiments of side enclosure 40 which include more than one element may require additional fixation devices.

Figure 11:
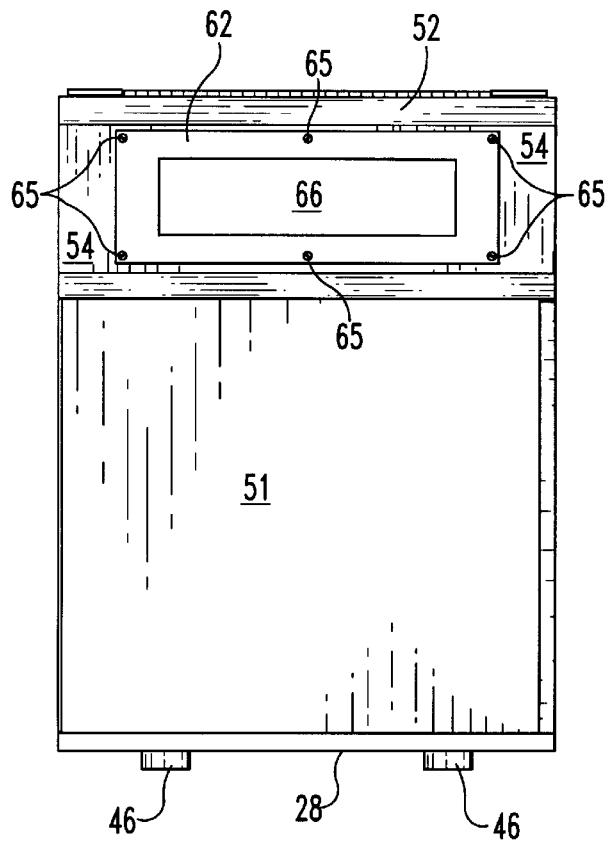
FIG. 11 is a rear elevational view of the parts feeder system of FIG. 1, with a covering plate coupled thereto.
Figure 12:
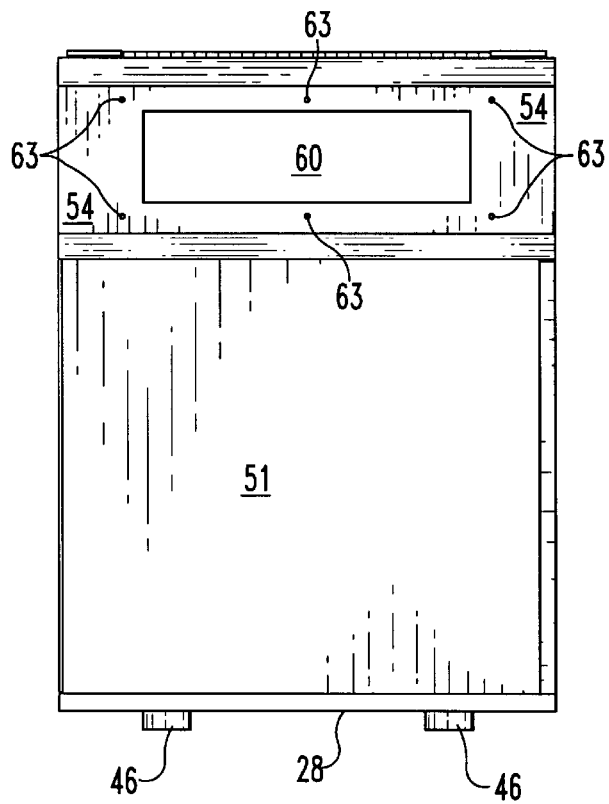
FIG. 12 is a view as in FIG. 11 with the covering plate removed.

Referring now to FIGS. 11 and 12, there is shown the rear of one embodiment of parts feeder system 22, with and without a covering plate, respectively. Frame element 54 has an opening 60 formed therein which allows access to the interior volume defined by, but not limited to frame element 52, frame element 54, and side enclosure 40, and more specifically the interior volume in which bowl 49 and associated drive mechanisms 50 of parts feeder system 22 are located. Opening 60 is large enough to accommodate chute portion 32 of auxiliary hopper 24, and may be of any shape, although a preferred shape for opening 60 is rectangular. In one embodiment, attachment holes 63 surround opening 60. In a specific embodiment, six attachment holes 63, threaded for screws, are provided, although it will be appreciated by one of ordinary skill in the art that alternate attachment elements can be provided.

The present invention can also include a cover plate 62. Cover plate 62 is attached, by suitable elements, to frame element 54 over at least a portion of opening 60. In the specific embodiment in which attachment holes 63 are threaded for screws, cover plate 62 includes threaded screw holes which correspond to the threaded screw holes 63 in frame element 54, and is attached by screws 65 to frame element 54.

Cover plate 62, in one embodiment, may completely block opening 60, or may only block a portion of opening 60. As illustrated in FIG. 9A, cover plate 62 may include an opening 66, which, when cover plate 62 is attached to rear frame element 54, communicates with opening 60 and therefore with the interior of parts feeder system 22. Opening 66 is of a proper dimension to accommodate chute portion 32 of auxiliary hopper 24.

Parts feeder system 22 can therefore be used with auxiliary hoppers of various sizes, with auxiliary hoppers having variously sized or located chute portions, or alternatively with no auxiliary hopper at all. If an auxiliary hopper is to be used, a cover plate 62 having an opening 66 sized to correspond to the chute 32 of auxiliary hopper 24 is preferably attached to frame element 54 of parts feeder system 22. However, cover plate 62 is not necessary to the interconnection and the operation of parts feeder system 22 and auxiliary hopper 24. Auxiliary hopper 24 and parts feeder system 22 are connected so that chute portion 32 penetrates opening 60 of frame element 54 and is positioned above bowl 49, yet still permits the opening of cover 41 to allow access to the machinery of parts feeder system 22.

To replace a first auxiliary hopper that is interconnected with parts feeder system 22 with a second auxiliary hopper, parts feeder system 22 and the interconnected first auxiliary hopper must be separated. If the opening in covering plate 62, if used, will not accommodate the chute portion of the second auxiliary hopper, then covering plate 62 must be removed and may be replaced with a different covering plate having an opening sized to accommodate the chute portion of the second auxiliary hopper. The chute portion of the second auxiliary hopper is then inserted through frame element 54 so that the chute portion is above bowl 49.

If no auxiliary hopper system is desired, a covering plate having no opening may be attached to frame element 54 of parts feeder system 22. Components may then be provided to the parts feeder system 22 by opening cover 41 and placing the components into bowl 49 of parts feeder system 22. To convert parts feeder system 22 from use with an auxiliary hopper to a direct manual feed mode, parts feeder system 22 and interconnected auxiliary hopper 24 are separated. Covering plate 62, if used, may be removed and replaced, if desired, with a different covering plate having no aperture therethrough. To reconvert the parts feeder system 22 from a direct manual feed mode for use with an auxiliary hopper, the covering plate having no aperture therethrough, if present, is removed, a covering plate having an aperture which will accommodate the chute portion of the desired auxiliary hopper may be attached to frame element 54, and the chute portion of the desired auxiliary hopper is inserted through frame element 54 so that the chute portion is above bowl 49.

The present invention thereby provides a parts feeder system capable of being used in an auxiliary hopper-fed mode, with one of a variety of auxiliary hoppers, or alternatively in a stand-alone manually-fed mode. It is understood that opening 60 may be placed in one of several places on the enclosure of the parts feeder system 22, including frame elements 52 and 54 and side enclosure 40, so long as cover 41 remains able to open. Accordingly, while the preferred embodiment of the invention places opening 60 and auxiliary hopper 24 at the rear of parts feeder system 22, it is understood that many different configurations are within the scope of the invention.

While the present invention has been illustrated and described in detail in the drawings and foregoing description, the same is to be considered as illustrative and not restrictive in character, it being understood that the preferred embodiments have been shown and described and that all changes and modifications that come within the spirit of the present invention are desired to be protected.

What is claimed is:

1. An apparatus comprising:
   an auxiliary hopper adapted for receiving parts therein; and
   a parts feeder system having a bowl for receiving parts therein and dispensing said parts individually, said parts feeder system having a first operative mode wherein said auxiliary hopper is removably physically coupled with said parts feeder system and delivers parts to said bowl, and a second operative mode wherein said auxiliary hopper is physically uncoupled from said parts feeder system and does not deliver parts to said bowl; and
   an enclosure substantially surrounding said bowl and having an opening allowing access to said bowl, and wherein in said first operative mode a portion of said auxiliary hopper is inserted in said opening.

2. An apparatus comprising: an auxiliary hopper adapted for receiving parts therein; and a parts feeder system having a bowl for receiving parts therein and dispensing said parts individually, said parts feeder system having a first operative mode wherein said auxiliary hopper is removably physically coupled with said parts feeder system and delivers parts to said bowl, and a second operative mode wherein said auxiliary hopper is physically uncoupled from said parts feeder system and does not deliver parts to said bowl; and
   wherein said first operative mode a portion of said auxiliary hopper is inserted in said opening.

3. The apparatus of claim 2 wherein said opening in said enclosure is at the rear of said enclosure.

4. An apparatus comprising:
   an auxiliary hopper adapted for receiving parts therein;
   a parts feeder system having a bowl for receiving parts therein and dispensing said parts individually, said parts feeder system having a first mode wherein said auxiliary hopper is removably coupled with said parts feeder system and delivers parts to said bowl, and a second mode wherein said auxiliary hopper is uncoupled from said parts feeder system and does not deliver parts to said bowl; and
   an enclosure substantially surrounding said bowl and having an opening allowing access to said bowl, and a covering plate removably coupled to said enclosure, said covering plate covering at least a portion of said opening in said enclosure.

5. An apparatus comprising:
   an auxiliary hopper adapted for receiving parts therein;
   a parts feeder system having a bowl for receiving parts therein and dispensing said parts individually, said parts feeder system having a first mode wherein said auxiliary hopper is removably coupled with said parts feeder system and delivers parts to said bowl, and a second mode wherein said auxiliary hopper is uncoupled from said parts feeder system and does not deliver parts to said bowl;
   an enclosure substantially surrounding said bowl and having an opening allowing access to said bowl; and
   a covering plate removably coupled to said enclosure that has an aperture therethrough which communicates with said opening of said enclosure.

6. The apparatus of claim 5 wherein, in said first mode, said auxiliary hopper has a chute portion, and said parts feeder system and said auxiliary hopper are coupled by removably inserting said chute portion into said aperture and said opening.

7. The apparatus of claim 4 wherein said covering plate has a solid surface.

8. An apparatus comprising:
   an auxiliary hopper adapted for receiving parts therein;
   a parts feeder system having a bowl for receiving parts therein and dispensing said parts individually, said parts feeder system having a first mode wherein said auxiliary hopper is removably coupled with said parts feeder system and delivers parts to said bowl, and a second mode wherein said auxiliary hopper is uncoupled from said parts feeder system and does not deliver parts to said bowl; and
   an enclosure substantially surrounding said bowl and having an opening allowing access to said bowl,
   wherein said enclosure includes:
      a base plate having at least one groove therein;
      a frame coupled to said base plate, said frame having at least one groove in at least a portion of said frame;
      at least one side enclosure member coupled to said frame and said base plate by fitting said side enclosure member in at least some of said at least one groove in said plate and in at least some of said at least one groove in said frame; and
      a cover member coupled to said frame and rotatable between an open position and a closed position.

9. The apparatus of claim 8 wherein said frame comprises:
   a first substantially planar frame member having at least one groove;
   a second substantially planar frame member coupled to a portion of said first substantially planar frame member and having at least one groove;
   one or more first longitudinal members each having at least one groove and being coupled to a portion of said second substantially planar frame member; and
   one or more second longitudinal members each having at least one groove and being coupled to a portion of one of said one or more first longitudinal members.

10. The apparatus of claim 8 wherein said frame comprises:
   a first substantially planar frame member having at least one groove;
   a second substantially planar frame member coupled to a portion of said first substantially planar frame member and having at least one groove;

a third substantially planar frame member coupled to a portion of said second substantially planar frame member and having at least one groove; and a fourth substantially planar frame member coupled to a portion of said third substantially planar frame member and having at least one groove.

11. The apparatus of claim 8 wherein said at least one groove in said base plate is proximate to and generally follows the perimeter of said base plate, and said at least one groove in said frame is proximate to and generally follows the edges of at least a portion of said frame.

12. The system of claim 8 wherein said frame and said cover member in said closed position form an angle of about 159°.

13. A system comprising:

vibratory parts feeder machinery having a bowl adapted for receiving parts therein and for individually dispensing said parts;

an enclosure substantially surrounding said machinery and having an opening for allowing access to said bowl; and an auxiliary hopper comprising a container portion, a chute portion, a drive portion, and a base portion, whereby, in a first mode, said vibratory parts feeder machinery is interconnected to said auxiliary hopper by inserting said chute portion of said auxiliary hopper into said opening of said enclosure to thereby deliver parts to said bowl, and in a second mode, said vibratory parts feeder is separated from said auxiliary hopper.

14. The system of claim 13, further comprising a covering plate coupled to said enclosure, said covering plate having an aperture therein for communicating with said opening and accommodating said chute portion when said system is in said first mode.

15. The system of claim 13, further comprising a covering plate coupled to said enclosure, said covering plate having a solid surface to substantially eliminate communication with said opening when said system is in said second mode.

16. A method of replacing a first auxiliary hopper having a chute portion with a second auxiliary hopper having a chute portion in an apparatus comprising said first auxiliary hopper coupled to a parts feeder system having an enclosure with an opening for accommodating said chute portion of said first auxiliary hopper, said method comprising:

uncoupling said first auxiliary hopper and said parts feeder system by withdrawing said chute portion of said first auxiliary hopper from said opening; and coupling said second auxiliary hopper and said parts feeder system by inserting said chute portion of said second auxiliary hopper into said opening.

17. A method of converting a parts feeder system having an enclosure with an opening therein from a first mode in which said parts feeder system receives parts from an auxiliary hopper having a chute portion, said auxiliary hopper being coupled to said parts feeder system by inserting said chute portion into said opening, to a second mode in which said parts feeder system does not receive parts from an auxiliary hopper, said method comprising:

separating the auxiliary hopper and the parts feeder system by withdrawing said chute portion from said opening.

18. The method of claim 17 further comprising:

coupling a covering plate having a solid surface to said enclosure of said parts feeder system to substantially cover said opening.

19. A method of converting a parts feeder system having an enclosure with an opening therein from a first mode in which said parts feeder system does not receive parts from an auxiliary hopper to a second mode in which said parts feeder system receives parts from an auxiliary hopper having a chute portion, said method comprising:

coupling the auxiliary hopper and said parts feeder system by inserting the chute portion of the auxiliary hopper into said opening.

20. The method of claim 19, further comprising:

removing a covering plate from said parts feeder system prior to said coupling step.

21. The method of claim 19, further comprising:

prior to said coupling step, attaching a covering plate having an aperture therein sized to accommodate the chute portion of the auxiliary hopper to said enclosure of said parts feeder system so that said aperture communicates with said opening.

* * * * *

UNITED STATES PATENT AND TRADEMARK OFFICE
CERTIFICATE OF CORRECTION

PATENT NO. : 6,109,475
DATED : August 29, 2000
INVENTOR(S) : S. Neal Graham

It is certified that error appears in the above-identified patent and that said Letters Patent is hereby corrected as shown below:

<u>Column 7,</u>
Line 51, insert the following immediately preceding "wherein":
-- an enclosure substantially surrounding said bowl and having an opening allowing access to said bowl, and --; and insert -- in -- immediately following "wherein".

Signed and Sealed this

Twenty-ninth Day of January, 2002

Attest:

*Attesting Officer*

JAMES E. ROGAN
*Director of the United States Patent and Trademark Office*